United States Patent Office 3,414,422
Patented Dec. 3, 1968

3,414,422
CHEMICALLY TREATED CLAYS
Joseph Iannicelli and James B. Whitley, Macon, Ga., and John Wesly Balentine, Borger, Tex., assignors to J. M. Huber Corporation, Locust, N.J., a corporation of New Jersey
No Drawing. Filed May 2, 1966, Ser. No. 546,587
5 Claims. (Cl. 106—288)

ABSTRACT OF THE DISCLOSURE

The disclosure teaches the brightening of clay by treating a clay slurry with a concentrated mineral acid and subjecting the clay acid mixture to high shear at an elevated temperature followed by washing the acid from the clay.

---

This invention is concerned with improving the brightness of clays. More particularly, this invention is concerned with a method for improving the brightness of kaolin clays through the use of acids.

Clays, in their natural state, vary considerably in their color properties, even when produced from mines in the same locality or from different sites in the same mine. Kaolin clay deposits contain discoloring contaminants, for example, iron and titanium minerals, montmorillonite, and other minerals. Often a clay is rejected as being unacceptable solely on the basis of color, even though its other physical properties such as viscosity and particle size are within desired limits.

A common or conventional method for increasing the brightness of clays is treatment with any of the well-known clay reducing agents, among those most useful are zinc and sodium hydrosulphite. This chemical bleaching usually results in an increase in brightness of around two to five points. In many instances this is insufficient to increase the brightness to acceptable specifications due to the original low brightness of the starting kaolin clay. Further, it has been ascertained that the use of large quantities of these chemical bleaching agents does not necessarily result in brightness improvement beyond a peak value.

It is, therefore, the primary object of this invention to provide a method for increasing the brightness of clays.

Another object of this invention is to provide a method for increasing the brightness of finished clays to acceptable specifications when starting from low brightness crude clays.

A further object of this invention is to provide a method for increasing the brightness of crude kaolin clays to acceptable specifications.

These and other objects and advantages will be apparent from the following detailed description.

Generally, the objects of this invention are accomplished by treating a clay slurry under conditions of high shear and high temperature with a mineral acid.

More specifically, clays from the mines are generally crushed or blunged and then slurried with water in order to produce a clay slip or slurry. Normally these slurries are then classified to the desired clay fraction by such well known methods as gravity sedimentation, hydroseparation and centrifugal forces. Prior to this classification, the clay slurries have usually been treated with a peptizing or dispersing agent in order to achieve a maximum dispersion of the clay particles to facilitate fractionation. These dispersing agents are conventional in the prior clay art and among those which may be used are polyphosphates, carbonates, silicates, alkalies in general, mixtures thereof and basic salts. The amounts of these agents used in the dispersion or deflocculation of the clay slurries may vary from 2 pounds per ton of dry clay to 20 pounds per ton of dry clay, the exact amount depending on the clay system itself and the amount of dispersion of the clay particles required.

We have discovered that by treating unbleached clay slurries with concentrated mineral acids a significant increase in brightness results. These significant increases are obtained when at least 200 pounds of acid per ton of dry clay is used and the clay slurry sheared by a rotating member having a peripheral speed of between 2,000 and 11,000 f.p.m. for a period of from 30 to 120 minutes at a temperature of from 60° C. to the boiling point of the slurry. If the quantity of acid is increased sufficiently the brightness resulting therefrom can be made to equal or surpass the peak value produced by conventional bleaching alone. However, if the acid treatment is followed by conventional bleaching the results are superior to acid treatment alone.

The clay solids in the slurry may vary from about 10 percent to about 70 percent with the preferred being 30 percent. Mineral acids used in the practice of the invention are sulfuric, hydrochloric and mixtures thereof.

A wide range of kaolin clays have shown significant brightness improvements by the use of this invention. These include the following clays: Hydrafine®, a paper coating clay having a particle size of 92 percent by weight of particles finer than two microns and a trace coaser than five microns; Hydrasperse®, a paper coating fraction having a particle size of 80-82 percent by weight finer than two microns and three to six percent coarser than five microns; CWF, a coarse fil'er fraction having a particle size of 30-40 percent by weight finer than two microns and 26-44 percent coarser than five microns; and a degritted crude clay having a particle size of 55-65 percent by weight finer than two microns and 15-25 percent coarser than five microns. In each case, a marked brightness improvement was obtained whether the starting material was unbleached or bleached by the conventional method. The effect was, of course, considerably greater when the starting material was unbleached. The brightness of clays is deteremined under a standard procedure described in TAPPI T–644 m-54. Hydrafine, Hydrasperse and CWF clays are Georgia kaolin clays mined and processed by the J. M. Huber Corporation, at Huber, Ga.

The types of shearing equipment which can be used in the practice of this invention are a Kady Mill, a Waring Blendor, a Krebs Impellor, a Cowles Dissolver, or equipment of similar design. Preheating the clay slurry to a temperature of about 60° C. reduces the time of shearing to attain the desired effect.

The invention will be more fully explained by the following examples which are illustrative and not limiting thereof. All percentages therein are by weight unless otherwise indicated. Concentrated sulfuric acid as used herein refers to a 98% aqueous solution of sulfuric acid. Concentrated hydrochloric acid as used herein refers to a 38% aqueous solution of hydrochloric acid.

EXAMPLE 1

As a control for the next twelve examples, an unbleached Hydrafine® clay having a G.E. brightness of 82.1 was slurried to 30% solids. A portion of this slurry was bleached with 10 pounds of zinc hydrosulphite and 8 pounds of alum per ton of dry clay. The finished clay had a G.E. brightness of 86.8.

EXAMPLE 2

A portion of the starting clay slurry of Example 1 was heated to 90° C. and then placed in the mixing cup of a Waring Blendor. To this was added 200 pounds of concentrated sulfuric acid per ton of dry clay and the shearing action started. The peripheral speed of the Waring Blendor impeller was 11,000 f.p.m., sufficient to maintain the temperature of this slurry between 90° C.–100° C. and was continued for one hour. At the end of the shearing period, the slurry was diluted with water and filtered. This clay had a brightness of 84.9. The filter cake was reslurried with water to 30 percent solids and bleached with ten pounds of zinc hydrosulphite per ton of dry clay. The finished clay had a brightness of 88.1.

EXAMPLE 3

Example 2 was repeated using 300 pounds of acid. The prebleached brightness was 85.5 and the bleached brightness was 88.5.

EXAMPLE 4

Example 2 was repeated using 450 pounds of acid. The prebleached brightness was 86.6 and the bleached brightness was 88.8.

EXAMPLE 5

Example 2 was repeated using 600 pounds of acid. The prebleached brightness was 87.5 and the bleached brightness was 89.0.

EXAMPLE 6

Example 2 was repeated using 900 pounds of acid. The prebleached brightness was 88.2 and the bleached brightness was 88.9.

EXAMPLE 7

Example 5 was repeated with the shearing time reduced to 30 minutes. The bleached brightness was 88.8.

EXAMPLE 8

Example 5 was repeated with the shearing time increased to 2 hours. The bleached brightness was 88.8.

EXAMPLE 9

A portion of the starting clay slurry of Example 1 was heated to 60° C. and placed in a mixing container with a Krebs Impellor. To this slurry was added 600 pounds of concentrated sulfuric acid per ton of dry clay and the shearing action started. The peripheral speed of the Krebs Impellor was 2,000 f.p.m. and the shearing was continued for one hour while maintaining the 60° C. temperature. At the end of the shearing period the slurry was diluted with water and filtered. This clay had a brightness of 82.8. The filter cake was reslurried with water to 30% solids and bleached with 10 pounds of zinc hydrosulphite per ton of dry clay. The finished clay brightness was 87.5.

EXAMPLE 10

Example 9 was repeated with the slurry preheated to 70° C. and with 70° C. maintained during the shearing. The unbleached brightness was 83.4 and the bleached brightness was 87.8.

EXAMPLE 11

Example 9 was repeated with the slurry preheated to 80° C. and with 80° C. maintained during the shearing. The unbleached brightness was 84.0 and the bleached brightness was 88.2.

EXAMPLE 12

Example 9 was repeated with the slurry preheated to 90° C. and with 90° C. maintained during the shearing. The unbleached brightness was 85.4 and the bleached brightness was 88.3.

EXAMPLE 13

Example 9 was repeated with the slurry preheated to 100° C. and with 100° C. maintained during the shearing. The unbleached brightness was 86.7 and the bleached brightness was 88.5.

EXAMPLE 14

As a control for the next four examples, an unbleached Hydrafine® clay having a G.E. brightness of 82.2 was slurried to 30% solids. A portion of the slurried clay was bleached with ten pounds of zinc hydrosulphite and eight pounds of alum per ton of dry clay. The finished clay had a G.E. brightness of 87.2.

EXAMPLE 15

A portion of the starting slurry of Example 14 was heated to 90° C. and placed in a mixing container with a Krebs Impellor. To this slurry was added 600 pounds of concentrated sulfuric acid per ton of dry clay and the shearing action was started. The peripheral speed of the impeller in the Krebs Impellor Mixer was 2,000 f.p.m. maintaining the slurry temperature at 90° C.–100° C. The shearing action was continued for one hour. The slurry was then diluted with water and filtered. This clay had a brightness of 86.7. The filter cake was reslurried with water to 30% solids and bleached with 10 pounds of zinc hydrosulphite per ton of dry clay. The finished clay brightness was 88.5.

EXAMPLE 16

Example 15 was repeated with a shearing impeller peripheral speed of 4,180 f.p.m. The unbleached brightness was 86.8 and the bleached brightness was 88.6.

EXAMPLE 17

Example 15 was repeated with a shearing impeller peripheral speed of 11,000 f.p.m. The unbleached brightness was 87.5 and the bleached brightness was 89.0.

EXAMPLE 18

An unbleached Hydrafine® clay having a G.E. brightness of 82.1 was slurried to 30% solids. A portion of this slurry was, as a control, bleached with 10 pounds of zinc hydrosulphite and 8 pounds of alum per ton of dry clay. The finished clay had a brightness of 86.8. Another portion of the slurry was heated to 90° C. and placed in the mixing cup of a Waring Blendor. To this was added 300 pounds of concentrated hydrochloric acid per ton of dry clay and the shearing action was started. The peripheral speed of the Waring Blendor impeller was 11,000 f.p.m. maintaining the slurry between 90° C. and 100° C. during the one hour shearing time. The slurry was then diluted with water and filtered. This clay had a brightness of 85.7. The filter cake was reslurried to 30% solids and bleached with 10 pounds of zinc hydrosulphite per ton of dry clay. The finished clay had a brightness of 88.6.

EXAMPLE 19

An unbleached Hydrasperse® clay having a G.E. brightness of 82.8 was slurried to 30% solids. A portion of this slurry was, as a control, bleached with 10 pounds of zinc hydrosulphite and 8 pounds of alum per ton of dry clay. The finished clay had a brightness of 86.8. Another portion of the slurry was heated to 90° C. and then placed in the mixing cup of a Waring Blendor. To this was added 600 pounds of concentrated sulfuric acid per ton of dry clay and the shearing action was started. The peripheral speed of the Waring Blendor impeller was 11,000 f.p.m. maintaining the slurry between 95° C. and 100° C. during the one hour shearing time. The slurry was then diluted with water and filtered. This clay had a brightness of 87.2. The filter cake was reslurried to 30% solids and bleached with 10 pounds of zinc hydrosulphite per ton of dry clay. The finished clay had a brightness of 87.8.

EXAMPLE 20

An unbleached CWF clay having a G.E. brightness of 79.1 was slurried to 30% solids. A portion of this slurry was, as a control, bleached with 10 pounds of zinc hydrosulphite and 8 pounds of alum per ton of dry clay. The finished clay had a brightness of 82.8. Another portion of the slurry was heated to 90° C. and then placed in the mixing cup of a Waring Blendor. To this was added 600 pounds of concentrated sulfuric acid per ton of dry clay and the shearing action started. The peripheral speed of the Waring Blendor impeller was 11,000 f.p.m. maintaining the slurry between 95° C. and 100° C. during the one hour shearing time. The slurry was then diluted with water and filtered. This clay had a brightness of 84.6. The filter cake was reslurried to 30% solids and bleached with 10 pounds of zinc hydrosulphite per ton of dry clay. The finished clay had a brightness of 85.1.

EXAMPLE 21

A low color unbleached Hydrafine® clay having a G.E. brightness of 71.1 was slurried to 30% solids. A portion of this slurry was, as a control, bleached with 10 pounds of zinc hydrosulphite and 8 pounds of alum per ton of dry clay. The finished clay had a G.E. brightness of 78.4. Another portion of the starting slurry was heated to 90° C. and placed in the mixing cup of a Waring Blendor. To this was added 600 pounds of concentrated sulfuric acid per ton of dry clay and the shearing action was started. The peripheral speed of the Waring Blendor impeller was 11,000 f.p.m. maintaining the slurry temperature between 95° C. and 100° C. and the shearing was continued for one hour. The slurry was then diluted with water and filtered. This clay had a brightness of 79.1. The filter cake was reslurried with water to 30% solids and bleached with 10 pounds of zinc hydrosulphite per ton of dry clay. The finished clay had a brightness of 84.9.

Alum was not used in any of these examples except the control examples as the slurry was already acidic due to the large excess of added acid.

Examples 2 through 6 demonstrate that the invention will produce significant increases in brightness when using from 200 to 900 pounds per ton of dry clay of the mineral acid.

Examples 5, 7 and 8 demonstrate that the invention will produce significant increases in brightness when varying the shearing time from ½ hour to 2 hours.

Examples 9 through 13 demonstrate that the invention will produce significant increases in brightness when preheating to, and maintaining of, slurry temperatures ranging from 60° C. to 100° C.

Examples 15 through 17 demonstrate that the invention will produce significant increases in brightness when varying the impeller peripheral speed from 2,000 f.p.m. to 11,000 f.p.m.

Example 18 demonstrates that hydrochloric acid acts to produce significant increases in brightness when following the teachings of the invention.

Examples 5 and 19 through 21 demonstrate that the invention will produce significant increases in brightness when varying the particular kaolin clays from coarse to fine and from low color to high color.

From the above examples, it is obvious that the preferred amount of acid used will be between 400 and 600 pounds per ton of dry clay, but the method of this invention operates very well with an amount as low as 200 pounds of acid and certainly up to and beyond 900 pounds of acid per ton of dry clay. In addition, while the mixing period of time with the acid treatment may vary from one-half hour and up, the preferred will be around one hour. Further, while the temperature may vary as low as around 60° C. and up to and around the boiling point, the preferred temperature is around the boiling point. The shear rate may vary as low as 2,000 f.p.m. peripheral speed and up to and around 11,000 f.p.m. peripheral speed with the preferred being around 11,000 f.p.m. Not only is the method of this invention applicable to clays of fine particle size but it is also applicable to the clays of coarse particle size.

While the present invention has been described with reference to certain embodiments thereof, it is obvious that there may be variations which fall within the true spirit and scope of the invention.

We claim:
1. A method for improving the brightness of koalin clay, comprising adding to a water-clay slurry a concentrated mineral acid selected from the group consisting of sulfuric acid, hydrochloric acid and mixtures thereof, in an amount of at least 200 pounds and not more than about 900 pounds per ton of dry clay, subjecting said slurry to high shear action of an impeller having a peripheral speed of at least 2,000 f.p.m. for at least 30 minutes and not more than 120 minutes at a temperature of at least 60° C. and not more than the boiling point of the slurry, and washing the mineral acid from the clay.

2. The method of claim 1 in which said acid is sulfuric acid, the shearing rate is 11,000 f.p.m., temperature is at 100° C., treating time is 60 minutes and bleaching said acid treated clay by reduction.

3. The method of claim 1 in which said acid is hydrochloric, shearing rate is 11,000 f.p.m., temperature is at 95° C.–100° C., treating time is 90 minutes and bleaching said treated clay.

4. The method of claim 1 in which the slurry is treated with at least 450 pounds of sulfuric acid per ton of dry clay.

5. The method of claim 1 in which the slurry is treated with at least 450 pounds of hydrochloric acid per ton of dry clay.

References Cited
UNITED STATES PATENTS

| | | |
|---|---|---|
| 1,959,448 | 5/1934 | Staufer et al. |
| 3,274,011 | 9/1966 | Duke. |
| 3,328,124 | 6/1967 | Mays et al. |

JAMES E. POER, *Primary Examiner.*